United States Patent
Turner

(10) Patent No.: US 7,334,713 B1
(45) Date of Patent: Feb. 26, 2008

(54) RACK SUPPORT ASSEMBLY FOR AN ATV

(76) Inventor: David W. Turner, 140 E. Canyon View La., Orangeville, UT (US) 84537

(*) Notice: Subject to any disclaimer, the term of this patent is extended or adjusted under 35 U.S.C. 154(b) by 464 days.

(21) Appl. No.: 10/976,645

(22) Filed: Nov. 1, 2004

(51) Int. Cl.
   *B60R 9/006* (2006.01)
(52) U.S. Cl. .................. 224/519; 224/530; 224/401; 224/410
(58) Field of Classification Search .......... 224/401, 224/519, 530, 410, 42.12, 511, 518; 211/29
   See application file for complete search history.

(56) References Cited

U.S. PATENT DOCUMENTS

| | | | |
|---|---|---|---|
| 4,087,115 A | | 5/1978 | Earle |
| 4,268,048 A | * | 5/1981 | Teraoka et al. ............. 280/834 |
| D291,190 S | * | 8/1987 | Davis ........................ D21/160 |
| 4,683,970 A | | 8/1987 | Smith |
| 5,746,275 A | * | 5/1998 | Cross et al. ................ 172/440 |
| 5,826,768 A | * | 10/1998 | Gamulo ...................... 224/486 |
| 5,845,918 A | | 12/1998 | Grinde et al. |
| 6,312,210 B1 | * | 11/2001 | Lang ......................... 414/540 |
| 6,378,748 B1 | * | 4/2002 | Cox ........................... 224/511 |
| 6,446,748 B1 | | 9/2002 | Suzuki |
| 6,461,095 B1 | * | 10/2002 | Puska ......................... 414/462 |
| 6,638,001 B1 | * | 10/2003 | McKinley ................... 414/462 |
| 6,659,566 B2 | * | 12/2003 | Bombardier .............. 298/22 R |
| 6,705,680 B2 | * | 3/2004 | Bombardier .............. 298/17 R |
| 6,732,892 B1 | * | 5/2004 | Mangrum .................. 224/401 |
| 6,769,858 B1 | * | 8/2004 | Butler et al. ................ 414/462 |
| 7,000,814 B2 | * | 2/2006 | Wang ......................... 224/520 |
| 2002/0084619 A1 | | 7/2002 | Odom |
| 2002/0145021 A1 | * | 10/2002 | Weaver ...................... 224/521 |
| 2003/0038150 A1 | * | 2/2003 | Williams .................... 224/401 |
| 2003/0111501 A1 | * | 6/2003 | McGraw et al. ........... 224/410 |
| 2003/0201109 A1 | * | 10/2003 | Bolen ......................... 172/817 |
| 2003/0205599 A1 | * | 11/2003 | Brown ........................ 224/401 |
| 2004/0164112 A1 | * | 8/2004 | McClain et al. ............ 224/401 |
| 2004/0195042 A1 | * | 10/2004 | Smith ......................... 182/127 |
| 2005/0205628 A1 | * | 9/2005 | Lehmann ................... 224/401 |
| 2005/0274573 A1 | * | 12/2005 | Smith ......................... 182/127 |

* cited by examiner

*Primary Examiner*—Paul N. Dickson
*Assistant Examiner*—Timothy D. Wilhelm

(57) ABSTRACT

A rack support assembly for an ATV for a rack and shock assembly that is removably attachable to a hitch and rack posts of an all terrain vehicle. The assembly comprises an upper bar and a lower bar. A pair of shock absorbers is coupled to and extends between the upper and lower bars so that the upper and lower bars are orientated parallel to each other. A coupler removably attaches the lower bar to the hitch so that the lower bar is horizontally orientated. Each of a pair of supports is attached to the upper bar. The supports are each removably attachable to one of the rack posts.

11 Claims, 2 Drawing Sheets

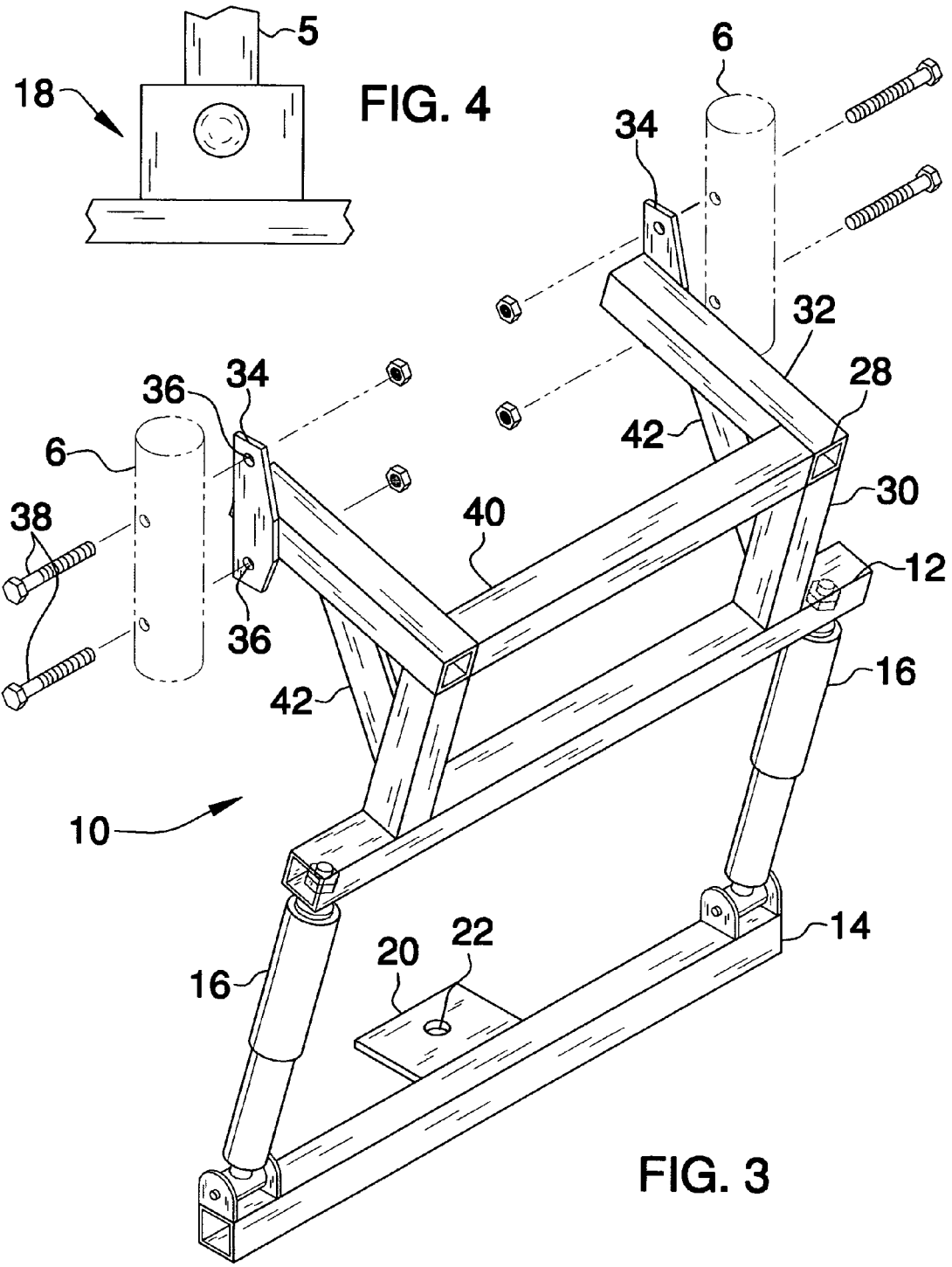

RACK SUPPORT ASSEMBLY FOR AN ATV

BACKGROUND OF THE INVENTION

1. Field of the Invention

The present invention relates to ATV rack devices and more particularly pertains to a new ATV rack device for that is removably attachable to rack posts of an ATV to provide additional support for an ATV rack when that rack is used for transporting heavy loads.

2. Description of the Prior Art

The use of ATV (all terrain vehicle) rack devices is known in the prior art. U.S. Pat. No. 4,683,970 describes a trailer device for attaching to a rear portion of an all terrain vehicle. This trailer includes its own shock absorbing members for stabilizing the trailer device. Other devices for stabilizing an all terrain vehicle are shown in U.S. Pat. No. 5,845,918 and U.S. Pat. No. 4,087,115 which describe shock absorber configurations for an all terrain vehicle.

While these devices fulfill their respective, particular objectives and requirements, the need remains for a device that acts as an auxiliary support system for an ATV which is attachable between a frame of the ATV and a load rack of the ATV to aid in preventing the weighing down of a back end of an ATV when a heavy load is placed on the load rack. Such weighing down can lead to a destabilization of the ATV when it is being driven. In particular, such a support system should be retrofittable to existing ATVs and should include shock absorbers to aid the shock absorbers of the ATV.

SUMMARY OF THE INVENTION

The present invention meets the needs presented above by generally comprising a rack and shock assembly for an all terrain vehicle that is removably attachable to a hitch and rack posts of the all terrain vehicle. The assembly comprises an upper bar and a lower bar. A pair of shock absorbers is coupled to and extends between the upper and lower bars so that the upper and lower bars are orientated parallel to each other. A coupler removably attaches the lower bar to the hitch so that the lower bar is horizontally orientated. Each of a pair of supports is attached to the upper bar. The supports are each removably attachable to one of the rack posts.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a perspective view of the present invention.

FIG. 4 is a top view of a coupler of the present invention.

DESCRIPTION OF THE PREFERRED EMBODIMENT

Figure 1:
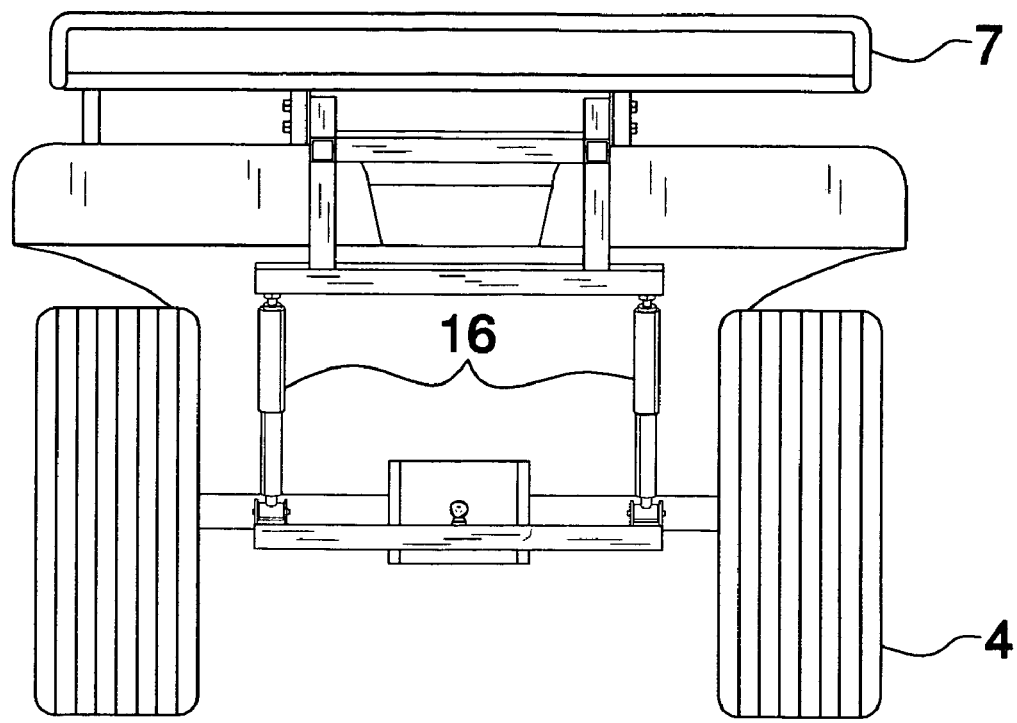
FIG. 1 is a front view of a rack support assembly for an ATV according to the present invention.
Figure 2:
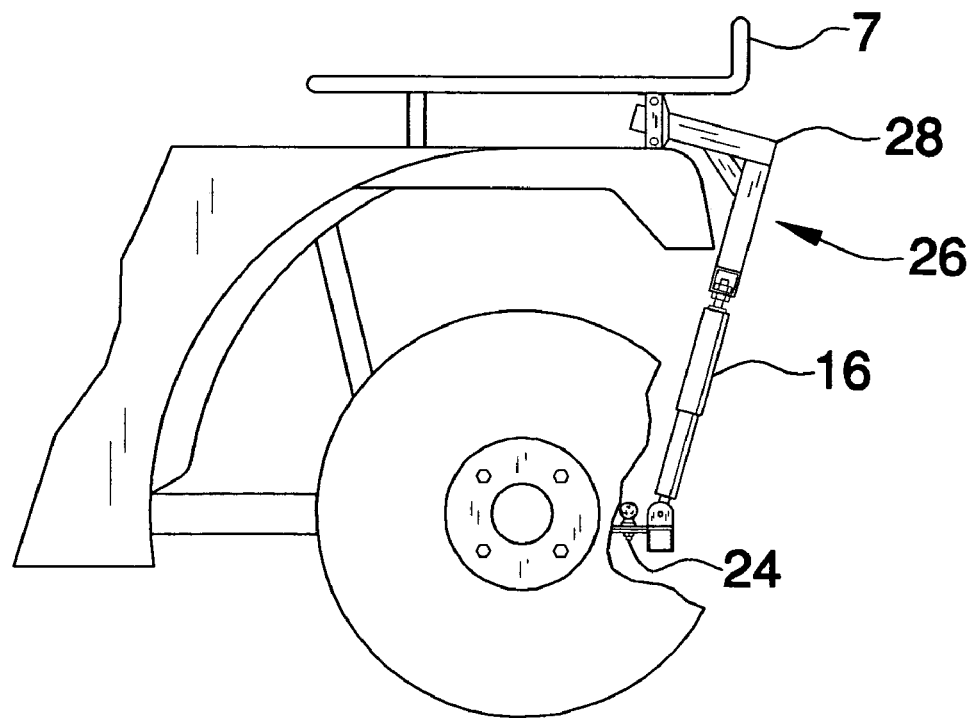
FIG. 2 is a side view of the present invention.

With reference now to the drawings, and in particular to FIGS. 1 through 4 thereof, a new ATV rack device embodying the principles and concepts of the present invention and generally designated by the reference numeral 10 will be described.

As best illustrated in FIGS. 1 through 4, the rack support assembly 10 for an ATV generally comprises an assembly 10 adapted for being removably attachable to a hitch 5 and rack posts 6 of an all terrain vehicle 4 (ATV). The assembly 10 comprises an upper bar 12 and a lower bar 14. A pair of conventional shock absorbers 16 is coupled to and extends between the upper 12 and lower 14 bars so that the upper 12 and lower 14 bars are orientated parallel to each other. A coupler 18 attaches the lower bar 14 to the hitch 5. The coupler 18 includes a panel 20 that is attached to the lower bar 14. The panel 20 has an opening 22 extending therethrough. A fastener 24 is removably extendable through the opening 22 and into the hitch 5 so that the upper 12 and lower 14 bars are horizontally orientated.

Each of a pair of supports 26 is attached to the upper bar 12. The supports 26 are each removably attached to one of the rack posts 6. Each of the supports 26 includes a pair of brackets 28 each including a leg portion 30 and an arm portion 32 attached to each other at a generally perpendicular orientation with respect to each other. The leg portions 30 are attached to the upper bar 12 and are spaced from each other. The arm portions 32 extend in a same direction with respect to each other and away from a plane extending along and through each of the upper 12 and lower 14 bars. Each of a pair of plates 34 is attached to one of the arm portions and each plate 34 is positioned adjacent to a free end of a respective one of the arm portions 32. Each of the plates 34 is positionable adjacent to one of the rack posts 6. The plates 34 each have at least one of aperture 36 extending therethrough, and preferably at least two apertures 36 extend through each of the plates 34. Each of a plurality of fasteners 38 is removably extendable through one of the apertures 36 and into an adjacent one of the rack posts 6.

A brace 40 is attached to and extends between the brackets 28. The brace 40 is orientated parallel to the upper bar 12. A pair of secondary braces 42 is provided. Each of the secondary braces 42 is attached to one of the brackets 28. The secondary braces 42 are attached to and extend between attached ones of the arm 32 and leg 30 portions. The brace 40, secondary braces 42 and brackets 28 are each constructed of a rigid metallic material.

In use, the assembly 10 is attached to the rack posts 6 and hitch 5 as described above. The assembly 10 provides additional stabilization for heavy loads which are positioned on a rack 7. Heavy loads, such as animal carcasses, travel packs and other items place increased force on the ATV's shock absorbers and the shock absorbers 16 of the assembly 10 aid in preventing the back end of the ATV from being forced down by the additional weight. The shock absorbers 16 of the assembly ensure that a smooth and stable ride is still encountered.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A rack and shock assembly for an all terrain vehicle, said assembly being removably attachable to a hitch and rack posts of the all terrain vehicle, said assembly comprising:
   an upper bar and a lower bar, a pair of shock absorbers being coupled to and extending between said upper and lower bars such that said upper and lower bars are orientated parallel to each other, a coupler removably attaching said lower bar to the hitch such that said lower bar is horizontally orientated, said coupler including a panel being attached to said lower bar, said panel having an opening extending therethrough, a fastener being removably extendable through said opening and into the hitch; and
   a pair of supports, each of said supports being attached to said upper bar, each of said supports being removably attached to one of the rack posts.

2. The assembly according to claim 1, wherein each of said supports comprises a pair of brackets each including a leg portion and an arm portion attached to each other at a generally perpendicular orientation with respect to each other, said leg portions each being attached to said upper bar and being spaced from each other, said arm portions extending in a same direction with respect to each other and away from a plane extending along and through each of said upper and lower bars, each of a pair of plates is attached to one of said arm portions and positioned adjacent to a free end of a respective one of said arm portions, each of said plates being positionable adjacent to one of the rack posts, each of said plates having at least one of aperture extending therethrough, each of a plurality of fasteners being removably extendable through one of said apertures and into an adjacent one of the rack posts.

3. The assembly according to claim 2, further including a brace being attached to and extending between said brackets, said brace being orientated parallel to said upper bar.

4. The assembly according to claim 3, further including a pair of secondary braces, each of said secondary braces being attached to one of said brackets, each of said secondary braces being attached to and extending between attached ones of said arm and leg portions.

5. The assembly according to claim 2, further including a pair of secondary braces, each of said secondary braces being attached to one of said brackets, each of said secondary braces being attached to and extending between attached ones of said arm and leg portions.

6. A rack and shock assembly for an all terrain vehicle, said assembly being removably attachable to a hitch and rack posts of the all terrain vehicle, said assembly comprising:
   an upper bar and a lower bar, a pair of shock absorbers being coupled to and extending between said upper and lower bars such that said upper and lower bars are orientated parallel to each other, a panel being attached to said lower bar, said panel having an opening extending therethrough, a fastener being removably extendable through said opening and into the hitch such that said upper and lower bars are horizontally orientated;
   a pair of supports, each of said supports being attached to said upper bar, each of said supports being removably attached to one of the rack posts, each of said supports including a pair of brackets each including a leg portion and an arm portion attached to each other at a generally perpendicular orientation with respect to each other, said leg portions each being attached to said upper bar and being spaced from each other, said arm portions extending in a same direction with respect to each other and away from a plane extending along and through each of said upper and lower bars, each of a pair of plates is attached to one of said arm portions and positioned adjacent to a free end of a respective one of said arm portions, each of said plates being positionable adjacent to one of the rack posts, each of said plates having at least one of aperture extending therethrough, each of a plurality of fasteners being removably extendable through one of said apertures and into an adjacent one of the rack posts;
   a brace being attached to and extending between said brackets, said brace being orientated parallel to said upper bar; and
   a pair of secondary braces, each of said secondary braces being attached to one of said brackets, each of said secondary braces being attached to and extending between attached ones of said arm and leg portions.

7. A rack and shock assembly for an all terrain vehicle, said assembly being removably attachable to a hitch and rack posts of the all terrain vehicle, said assembly comprising:
   an upper bar and a lower bar, a pair of shock absorbers being coupled to and extending between said upper and lower bars such that said upper and lower bars are orientated parallel to each other, a coupler removably attaching said lower bar to the hitch such that said lower bar is horizontally orientated; and
   a pair of supports, each of said supports being attached to said upper bar, each of said supports being removably attached to one of the rack posts, each of said supports comprising a pair of brackets each including a leg portion and an arm portion attached to each other at a generally perpendicular orientation with respect to each other, said leg portions each being attached to said upper bar and being spaced from each other, said arm portions extending in a same direction with respect to each other and away from a plane extending along and through each of said upper and lower bars, each of a pair of plates is attached to one of said arm portions and positioned adjacent to a free end of a respective one of said arm portions, each of said plates being positionable adjacent to one of the rack posts, each of said plates having at least one of aperture extending therethrough, each of a plurality of fasteners being removably extendable through one of said apertures and into an adjacent one of the rack posts.

8. The assembly according to claim 7, wherein said coupler includes a panel being attached to said lower bar, said panel having an opening extending therethrough, a fastener being removably extendable through said opening and into the hitch.

9. The assembly according to claim 7, further including a brace being attached to and extending between said brackets, said brace being orientated parallel to said upper bar.

10. The assembly according to claim 9, further including a pair of secondary braces, each of said secondary braces being attached to one of said brackets, each of said secondary braces being attached to and extending between attached ones of said arm and leg portions.

11. The assembly according to claim 7, further including a pair of secondary braces, each of said secondary braces being attached to one of said brackets, each of said secondary braces being attached to and extending between attached ones of said arm and leg portions.

* * * * *